(12) United States Patent
Malmquist et al.

(10) Patent No.: US 11,072,889 B2
(45) Date of Patent: Jul. 27, 2021

(54) CLOTHING FOR A MACHINE FOR PRODUCING A FIBROUS WEB AND METHOD FOR PRODUCING A CLOTHING OF THIS TYPE

(71) Applicant: VOITH PATENT GMBH, Heidenheim (DE)

(72) Inventors: Johan Malmquist, Katrineholm (SE); Hans-Joergen Johansson, Hoegsjoe (SE)

(73) Assignee: Voith Patent GmbH, Heidenheim (DE)

( * ) Notice: Subject to any disclaimer, the term of this patent is extended or adjusted under 35 U.S.C. 154(b) by 190 days.

(21) Appl. No.: 16/313,943

(22) PCT Filed: May 30, 2017

(86) PCT No.: PCT/EP2017/062974
§ 371 (c)(1),
(2) Date: Dec. 28, 2018

(87) PCT Pub. No.: WO2018/001668
PCT Pub. Date: Jan. 4, 2018

(65) Prior Publication Data
US 2019/0194869 A1    Jun. 27, 2019

(30) Foreign Application Priority Data
Jun. 28, 2016    (DE) ..................... 10 2016 111 769.2

(51) Int. Cl.
*D21F 1/00* (2006.01)
*D21F 1/10* (2006.01)
(Continued)

(52) U.S. Cl.
CPC ................. *D21F 7/10* (2013.01); *D03D 1/00* (2013.01); *D03D 11/00* (2013.01); *D06H 7/02* (2013.01);
(Continued)

(58) Field of Classification Search
CPC ........ D21F 1/00; D21F 1/0027; D21F 1/0036; D21F 1/0045; D21F 1/0054;
(Continued)

(56) References Cited

U.S. PATENT DOCUMENTS 2,672,169 A * 3/1954 Walters ................ D03D 1/0094
139/383 R
4,460,023 A * 7/1984 Mullaney ............... D21F 1/0036
139/383 A
(Continued)

FOREIGN PATENT DOCUMENTS

WO    WO 89/12717    * 12/1989 ............... D21F 1/00
WO    2004055265 A1    7/2004
(Continued)

*Primary Examiner* — Eric Hug
(74) *Attorney, Agent, or Firm* — Laurence A. Greenberg; Werner H. Stemer; Ralph E. Locher

(57) ABSTRACT

A covering is particularly suited for use in a machine for producing and/or finishing a paper, cardboard, tissue or pulp web. The covering has a basic structure formed as a part of a flat woven material, which flat woven material is designed as a woven material by interlacing warp threads and weft threads. The portion of the flat woven material has a plurality of sections that are formed integrally with each other, with at least one property of one of the sections differing from the respective property of at least one adjacent section.

18 Claims, 2 Drawing Sheets

(51) Int. Cl.
- *D21F 1/12* (2006.01)
- *D21F 1/14* (2006.01)
- *D21F 7/08* (2006.01)
- *D21F 7/10* (2006.01)
- *D21F 7/12* (2006.01)
- *D03D 11/00* (2006.01)
- *D03D 1/00* (2006.01)
- *D06H 7/02* (2006.01)
- *D06H 7/14* (2006.01)
- *D06J 1/12* (2006.01)

(52) U.S. Cl.
CPC ............... *D06H 7/14* (2013.01); *D06J 1/12* (2013.01); *D21F 1/0027* (2013.01); *D21F 1/0036* (2013.01); *D21F 1/0054* (2013.01); *D21F 1/10* (2013.01); *D21F 7/08* (2013.01); *D21F 7/083* (2013.01); *D03D 2700/0162* (2013.01)

(58) Field of Classification Search
CPC .......... D21F 1/0081; D21F 1/10; D21F 1/105; D21F 1/12; D21F 1/14; D21F 1/16; D21F 7/08; D21F 7/083; D21F 7/10; D21F 7/12; D03D 1/00; D03D 3/04; D03D 11/00; D03D 2700/0162

USPC ............... 162/348, 358.2, 900, 902–904; 139/383 A, 383 AA, 425 A

See application file for complete search history.

(56) References Cited

U.S. PATENT DOCUMENTS

| | | | | |
|---|---|---|---|---|
| 4,649,964 | A * | 3/1987 | Smith | ............ D03D 23/00 139/383 A |
| 2003/0207069 | A1* | 11/2003 | Moriarty | ............ D21F 7/083 428/60 |
| 2009/0090425 | A1* | 4/2009 | Hawes | ............ D21F 7/083 139/383 AA |
| 2009/0211722 | A1* | 8/2009 | Crook | ............ D21F 7/10 162/358.4 |
| 2014/0069549 | A1 | 3/2014 | Ryan et al. | |

FOREIGN PATENT DOCUMENTS

| | | |
|---|---|---|
| WO | 2009106182 A1 | 9/2009 |
| WO | 2013083468 A1 | 6/2013 |

\* cited by examiner

CLOTHING FOR A MACHINE FOR PRODUCING A FIBROUS WEB AND METHOD FOR PRODUCING A CLOTHING OF THIS TYPE

BACKGROUND OF THE INVENTION

Field of the Invention

The invention is based on a covering, in particular a press felt, which is used in a machine for producing and/or finishing a fibrous web such as a paper, board or tissue web. The press felt has a basic structure designed as a portion of a flat woven material, the flat woven material being formed by intersecting warp threads and weft threads. The invention also pertains to a method for producing such a covering.

In a press section of a paper, board or tissue machine, clothings in the form of press felts are used, which among other things serve to absorb water that is pressed out of the fresh fibrous web by the pressure applied in one or more press nips. In this case, the press felts are exposed to a multiplicity of loads, and in addition, their properties are subject to strenuous requirements in terms of marking tendency, dewatering capacity, resilience and running-in behavior.

Usually, such press felts have a load-bearing basic structure, one or more staple fiber layers and additionally one or more functional layers, which are arranged on top of each other and are interconnected. The functional layers may for example contain films or membranes that are more or less permeable to gases and liquids.

Interconnecting the layers is usually done by needling. In this case, the components are arranged in the desired number and sequence and supplied to a needling path, on which the fibers of the staple fiber layers are pulled through barbs on the needles through the load-bearing base structure and the optional additional functional layers and in this way the layers are fixed and anchored to each other.

Furthermore, it is known in the art to produce press felts from two or more layers of a simple load-bearing basic structure to simplify the production, wherein the basic structure is present as a flat woven material and is folded back on itself at least once and then joined together at its ends to form an infinite clothing.

For example, WO 2009/106182 A1 discloses a clothing and a method of manufacturing the same. The clothing comprises a flat woven material having a top side, a bottom side and two ends. The flat woven material has two fold lines at which the material is folded over onto itself. The fold lines are arranged in such a way that the ends of the flat woven material are arranged in a region remote from the fold lines. The ends are connected together to yield an endless tubular structure that is laid flat.

In addition, WO 2013/083468 A1 shows a method of manufacturing a seam for a clothing. The clothing has weft and warp threads that are woven together into a fabric structure. Some weft threads are removed from the fabric structure and then deposited on themselves so that loops are formed in the region of the removed weft threads, and these loops are formed from the warp threads. The loops form one end of the later clothing. The loops are interlaced with analogously-formed additional loops at the other end of the fabric structure and a seam wire is inserted so that the clothing may be made endlessly.

One drawback of these press felts that are known in the art is in particular their tendency to be marked. When combining two fabric layers by the Moiré effect there is a risk of generating undesired patterns in the fibrous web; on the other hand, the seam tends to also cause markings in the fibrous web, which are caused by the changed properties in the vicinity of the seam in the clothing, in particular changed permeability and thickness.

SUMMARY OF THE INVENTION

Accordingly, it is an objective of the invention to provide a clothing that is easy to manufacture and also avoids or at least mitigates the known drawbacks of the prior art.

This objective is achieved with respect to the covering by the claimed invention, and with respect to the method for manufacturing a corresponding covering, as claimed; in each case in conjunction with the generic features.

According to one aspect of the invention, it is envisioned that a clothing, in particular for use in a machine for manufacturing and/or finishing a paper, cardboard, tissue or pulp web, comprises a basic structure designed as a portion of a flat woven material, the flat woven material being formed by intersecting warp threads and weft threads, wherein the portion of the flat woven material has a plurality of sections that are designed integrally with each other, and wherein at least one property in one of the sections is different from the respective property of at least one adjacent section.

According to an additional aspect of the invention, a method is envisioned that comprises the following steps: i) producing a flat woven material by weaving a sequence of sections, ii) cutting to length a portion of the flat woven material that comprises three sections, iii) folding the portion along transition points between the sections, iv) depositing the folded-over parts of the flat woven material onto the flat woven material, and v) connecting the ends of the portion.

This makes it possible to manufacture a clothing from a piece of flat woven material and completely dispense with assembling it from individual portions having different properties. This eliminates complex steps such as cutting to length, stacking and fixing, which each may give rise to error and thus may negatively impact the quality of the finished clothing. The clothing of the invention is simple and quick to manufacture, has no superfluous interfaces and is not only cost-effective but also reliable and minimally prone to marking.

Further advantageous features and embodiments will be apparent from the subordinate claims.

In clothings according to the invention or clothings that are produced by a method according to the invention, when using the clothing in a machine, such as a papermaking machine, the threads are usually oriented so that the warp threads of the loom are oriented in the machine direction, while the weft threads of the loom run perpendicular to the machine direction.

It may advantageously be provided that the at least one property is selected from among: Weave pattern, number of web layers, material of the weft threads, material thickness of the weft threads and/or density of the weft threads. The properties mentioned above may be selected and combined in a simple and effective manner using modern techniques in the field of weaving and material selection and composition.

According to an advantageous exemplary embodiment, it may be provided that at least one of the sections is woven in one layer and at least one of the other sections is woven in two or more layers. This leads to a higher absorption capacity in this section for water from the fibrous web.

According to an additional advantageous exemplary embodiment, it may be provided that the thickness of the weft threads of at least one of the sections is different from a thickness of the weft threads of at least one of the other sections. By suitably selecting the material thickness, a further increase of the void volume of the clothing may be achieved.

According to a further advantageous exemplary embodiment, the material of the weft threads of at least one of the sections may be different from a material of the weft threads of at least one of the other sections. With regard to the selection of the material, both the material of the weft threads and the material of the warp threads may be changed a section at a time. This latter is possible in particular by section-wise coating of the warp threads. In addition, the weft threads may additionally or alternatively have section-wise coatings that change the properties of a section.

Preferably, the portion has three successive sections that extend one behind the other in a machine direction of the clothing, wherein a first portion is followed by a second section that is followed by a third section.

Advantageously, a common length of the first and third sections in the machine direction may correspond to at least one length of a second section in the machine direction, and in particular may exceed the same by 0-5%, preferably by 3%. In this way, an edge-to-edge, overlapping or interlocking connection of the ends may be established.

With a flat woven material of this kind, for example by means of a method according to the invention, a basic structure may be formed that is designed in a hose shape and is wholly multi-layered along its length, without combining a plurality of individual fabric layers with the same weave pattern as had been the case in the prior art. The properties of the first and third sections may be selected specifically differently from those of the second section, so that the moiré effect, which is known to be disturbing, may be avoided. In addition, a basic structure of this kind may be manufactured simply, quickly and cost-effectively.

According to a preferred alternative exemplary embodiment, the length of the first and third sections may be the same and less than 50 cm, preferably less than 20 cm, particularly preferably less than 5 cm. In this way, a connection region is created, in which the first and the third section are superimposed on each other and are then fixed to each other, so as to manufacture a continuous two-layer clothing when the first and third sections are single-layered and the second section is double-layered. Depending on the use case, a different length of the connection region may be advantageous. For example, some methods of joining may require a longer or shorter connection region than others. In particular, a shorter connection region may be advantageous if only a smaller part of the clothing is subjected to stress via the joining method.

The different length of the connection region allows the use of different joining methods that allow different protection.

Advantageously, the properties of the first section and the third section may be the same. With regard to the multi-layer design of the clothing, it is suitable that the sections that together form the thinner machine-side layer are the same.

Preferably, at least one property of the second section may be different than the properties of the first and third sections. The property or properties are chosen, for example, so that the void volume of the second section is higher than that of the other two sections, so that the water absorption capacity of the entire clothing is straightforwardly increased.

A further advantage is that the method according to the invention may comprise, in a further step, removing the weft threads to form seam loops and, in addition, introducing stabilizing seams. As a result, seam loops may straightforwardly be formed without additional connecting sections. The incorporation of stabilizing seams may effectively prevent adjacent weft threads from entering the seam loops and closing them before a seam wire is inserted. In addition, a multi-layered hose-shaped composite may be achieved, and in this way, slippage of the layers relative to each other may be avoided.

According to an advantageous alternative configuration of the invention, it may be provided that the method alternatively comprises the method step of folding over at an arbitrary location within the second section, with the first and third sections being superimposed on each other and brought into line and in particular being subsequently connected together, and the first and the third sections being woven in one layer and the second section in two layers. The advantage of this embodiment lies in the fact that in this way, the entire clothing is straightforwardly formed with two layers throughout, and may be made endless without complex process steps.

Preferred embodiments of the method according to the invention may provide that the connection takes place by gluing, ultrasonic welding or laser welding. Such compounds are characterized by high resilience and reliability, without affecting the permeability or water absorption capacity of the clothing in this area.

BRIEF DESCRIPTION OF THE SEVERAL VIEWS OF THE DRAWING

The invention will be explained in more detail below with reference to the drawings, but without limiting its generality. The drawings show the following.

DESCRIPTION OF THE INVENTION

Clothings are used at various positions in machines for manufacturing or finishing a fibrous web, such as a paper, cardboard or tissue web. In the forming part, where sheet formation takes place, the requirements with regard to the desired orientation of the fibers and an effective initial dewatering are foremost, while in the press part, additional water should be removed and the fibrous web should be pre-smoothed. Finally, in the drying part, the dry content of the fibrous web is further increased. Accordingly, the clothings are subject to different requirements at different positions.

In the press section, in which the clothings described below are used, mechanical pressure is exerted on the fibrous web and the clothing that bears the fibrous web by rollers. Furthermore, by applying suction under negative pressure, a flow of air and water is generated via the fibrous web and clothing, and in this way water is withdrawn from the fibrous web. In addition, the clothing is under tension during operation, generating additional mechanical loads. The corresponding mechanical and hydraulic loads and the demand for a uniformly smoothed and already largely dewatered fibrous web place high demands on the clothing.

To avoid the above-mentioned marking tendency of the seam, it is known in the art to manufacture clothings in circular looms. However, this is a very complex and therefore expensive form of production, and also has limitations in terms of the lengths and widths that may be produced. Flat-woven structures made endless by stitching have become more popular than round-woven clothings, because of their ease of manufacture and more flexible dimensions.

In a further development of the already long-known concept of producing a clothing with a simple weave pattern quickly and favorably as a flat woven material and to achieve both the functionality and the seam by folding the flat woven material and making it endless through successive method steps, it is now proposed to produce the flat woven material in such a way that successive sections in the machine direction are already formed with different properties when they are manufactured.

Figure 1:
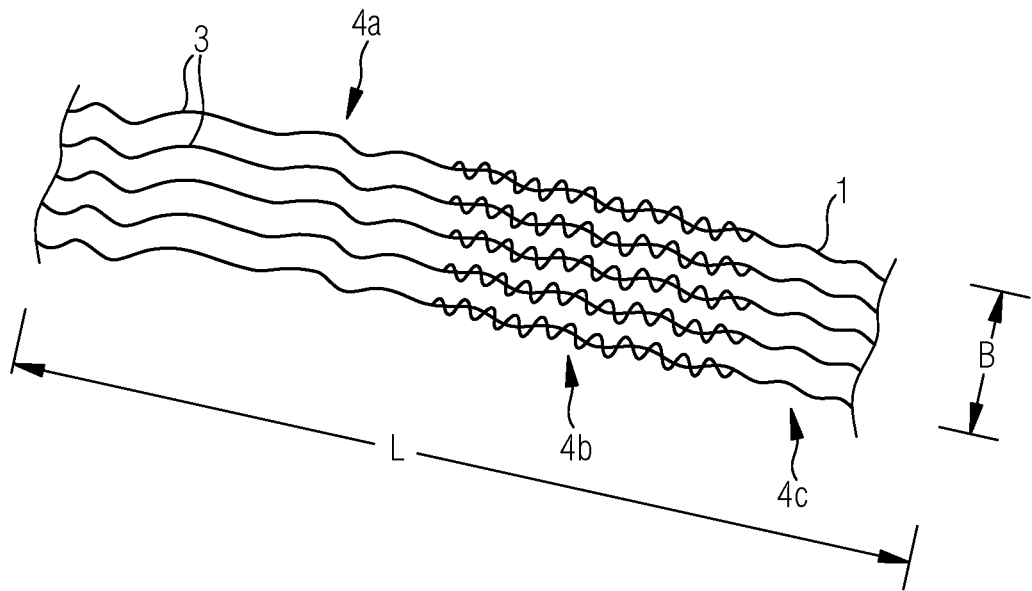
FIG. 1 a highly schematic view of an exemplary embodiment of a flat woven material for manufacturing a clothing according to the invention, FIG. 2 a likewise highly schematic view of a longer section of a flat woven material, FIG. 3 a highly schematic lateral view of a clothing according to one aspect of the invention, and FIG. 4 a highly schematic lateral view of an exemplary embodiment of a clothing according to another aspect of the invention.

FIG. 1 shows a highly schematic illustration of a portion of a flat woven material for manufacturing a clothing 2. The flat woven material 1 may be manufactured in any width B, which may be adapted for different widths of a fibrous web machine. Working widths of up to 11 m are no longer unusual. The flat woven material 1 is produced on in sufficient width on corresponding looms that are likewise known in the art. The width B is determined by the number of adjacent warp threads 3 in the loom. These threads form the load-bearing structure, oriented in the machine direction, in the subsequent clothing 2. The warp threads 3 are crossed by weft threads, not shown in FIG. 1 for the sake of clarity, which are introduced at an angle of about 90° to the direction of the warp threads 3, and the warp threads 3 alternatively cross over and under them in a predetermined pattern. A detailed explanation of the process of producing such a flat woven material 1, for example, in linen, twill or satin weave may be omitted here, because corresponding methods are long known in the art. An arbitrary length L of the flat woven material 1 may be created, limited only by the length of the warp threads 3. The flat woven material 1 may be wound into rolls 1, and is then available for further processing. However, it is also possible to cut the flat woven material 1 immediately after it leaves the loom and immediately supply it to the next processing step without rolling.

From FIG. 1, it may be seen that the flat woven material 1 according to the invention comprises a plurality of sections 4, which have, for example, different numbers of layers or other properties in which the sections 4 diverge from each other. Thus, a single-layered tissue is present in a first section 4a, a double-layered tissue is present in a second section 4b adjoining the first section 4a, and a single-layered tissue is again present in a third section 4c that adjoins the second section 4b. Depending on the design and requirements for the clothing 2 to be made endless subsequently, in particular the weave patterns of the first section 4a and third section 4c may be the same.

Furthermore, it is also possible, not only for the number of layers of the flat woven material 1 to be designed to be different, but also in particular for properties of the clothing 2 that influence the water absorption capacity of the clothing 2 in the sections 4 to be designed to be different. Thus, in addition to the change in the number of fabric layers, the weave pattern per section 4 may also be designed differently. In the exemplary embodiment of the invention shown in FIG. 1, the flat woven material 1 is formed in two layers in the second section 4b. The actual weave patterns, i.e. the sequence of intersections between warp threads 3 and weft threads, may in this case be the same or different in the three sections 4a, 4b and 4c, but are preferably always the same in sections 4a and 4c.

Another possibility is to vary the materials used from one section to another. "Materials" may refer here to both the actual material of the threads and the coatings of the warp and/or weft threads. Thus, it is possible, for example, to leave the warp threads 3 the same over the entire length of the flat woven material 1, while different materials may be used for the weft threads in the different sections 4a, 4b and 4c. For the materials, any materials that all customary in the production of paper machine clothings or other technical woven materials, such as PA 6, PA 6.6, PA 6.12, PET, PPS, PBT, PE, PP, etc., or mixtures and combinations thereof, may be considered. In manufacturing the flat woven material 1, therefore, a first material may be used for the weft threads in the first section 4a, and in the second section 4b a second material may be used that differs from the material of the first section 4a, and in the third section 4c again a different material may be used that differs from the material of the second section 4b. In this case, the materials of the first section 4a and third section 4c are preferably the same. Furthermore, it is conceivable to furnish the warp threads 3 in the region of the second section 4b with a coating, and leave all other properties the same. Alternatively or additionally, the weft threads may be coated. For example, hydrophobic, hydrophilic or dirt-repellent coatings may be provided that may be selected according to the requirements.

It is also conceivable to vary the thickness of the weft threads in the individual sections 4, so that weft threads of a first thickness are used in the first and third sections 4a, 4c, while weft threads of a second thickness that differs from the first thickness are introduced in the second section 4b. The thickness of the weft threads in the second section 4b may in particular be greater than in the other sections 4a, 4c. Twisted or plied wefts consisting of a plurality of individual threads, ribbon or other suitable textile structures may still be woven here.

The measures described above may be combined as desired in order to further amplify the changed properties of the individual sections 4.

Figure 2:
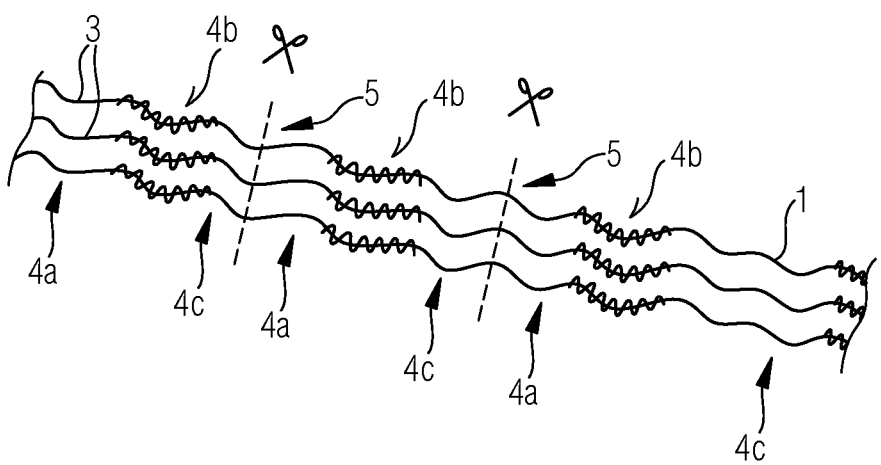

In FIG. 2, a portion of the flat woven material 1 is shown in a similar manner as in FIG. 1. In FIG. 2 are shown several of the section sequences 4a, 4b and 4c that were shown in FIG. 1. This is provided for the sake of clarity, in relation to manufacturing a clothing 2 from the flat woven material 1 as described in greater detail below.

Viewing FIG. 2 from left to right, respective sections 4 with different properties follow each other, and the weave patterns, number of layers, etc., may change as described above. First, a section 4a is shown followed by a first two-layered section 4b. This in turn is followed by a section 4c which at the same time forms the leading section 4a with respect to the next following second section 4b. This sequence is repeated over the entire length of the flat woven material 1.

The length of a section sequence 4a, 4b, 4c is determined by the length of the subsequent clothing 2, as will be explained in greater detail below. It is of course possible to weave a section sequence 4a, 4b, 4c over a certain length for a first clothing 2 and produce the next section sequence 4a, 4b, 4c over a different length, which is suitable for a second clothing 2 over a length that deviates from that of the first clothing 2.

Figure 3:
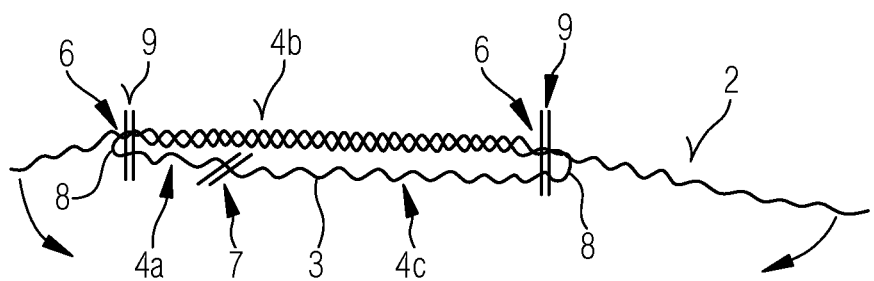

In FIG. 2, it is already shown in advance that the flat woven material 1 in FIG. 3 is cut along the cut lines 5 in order to be further processed into a clothing 2. This results in portions that respectively comprise a section sequence 4a, 4b, 4c, wherein the length in the machine direction according to a first embodiment should be such that the sections 4a and 4c together are at least as long as the section 4b. A certain overlap may also be provided, such that the length of sections 4a and 4c collectively exceed the length of section 4b by 0-5%, preferably by about 3%, such that a connection may be made end-to-end or by overlapping the ends or by interleaving the ends of the warp threads 3.

This is to be understood with reference to FIG. 3, which shows a highly schematic lateral view of a clothing 2 made of the flat woven material 1 shown in FIGS. 1 and 2.

In the exemplary embodiment shown in FIG. 3, the clothing 2 consists of a portion of the flat woven material 1 that was separated along the section lines 5 of the flat woven material 1. Thus, in this case there is a portion that comprises a first section 4a with a first weave pattern, first layer count, etc., and this first section 4a is followed by a second section 4b with second weave pattern, second layer count, etc., followed by a third section 4c with third weave pattern, third layer number, etc. The weave pattern, number of layers, etc. of the third section 4c corresponds to the weave pattern, number of layers, etc. of the first section 4a.

The portion of the flat woven material 1 is now folded over at transition points 6 that form the transition between the first section 4a and the second section 4b and between the second section 4b and the third section 4c. Sections 4a and 4c are deposited on the section 4b. The ends 7 of the sections 4a and 4c at least touch or overlap each other slightly, as mentioned above. These ends 7 are connected to each other in an abutting or overlapping manner by a suitable connecting process such as for example ultrasonic or laser welding or another joining process suitable for the purpose, which may be known per se, such as gluing.

Thus a structure has been formed that is designed like a hose and after flattening is completely multi-layered over its entire length, without combining a plurality of single clothing layers having the same weave pattern as in the prior art, so that the moiré effect, which is known to be disturbing, is avoided, and in addition, manufacturing the clothing 2 may be considerably simplified. The ends 7 of the flat woven material 1 are preferably not centered, but are moved to one of the transition points 6 under the section 4b and are covered by the section 4b because during operation they rest on the rollers of the fibrous web machine on the roller and not on the fibrous web, and in this way, the marking tendency of the seam formed at the ends 7 is reduced. Finally, the multi-layered character of section 4b, in conjunction with the underlying sections 4a and 4c, is an effective way to increase the liquid absorption capacity of the clothing 2, which is also referred to as the void volume.

The structure may now be further processed so that seam loops 8 are manufactured at their ends that are oriented in the machine direction. For this purpose, individual weft threads are pulled out of the woven material at the transition points 6 until seam loops 8 are formed, which are inserted into each other and may be connected by a seam wire so as to produce the finished clothing 2. In the area of the seam loops 8, stabilizing seams 9 may be attached that ensure that the next weft threads, which are directly adjacent to the seam loops 8, do not migrate into the seam loops 8 and thus complicate or prevent inserting a seam wire to make the clothing endless 2. The clothing 2 is also stabilized as a whole by the stabilizing seams 9, so that the tubular structure is no longer able to slip. In positions that exert little tension on the clothing 2, such as in the field of tissue production, the connection of the ends 7 may potentially be eliminated by introducing the stabilizing seams 9, which in turn reduces both the marking tendency and the manufacturing costs.

By means of having fewer production steps, an at least two-layered structure has now been straightforwardly created from an endless flat woven material 1, and this structure may be made endless by introducing a seam wire. The clothing 2 may thus be easily fed into any machine without the need for cantilever components.

Figure 4:
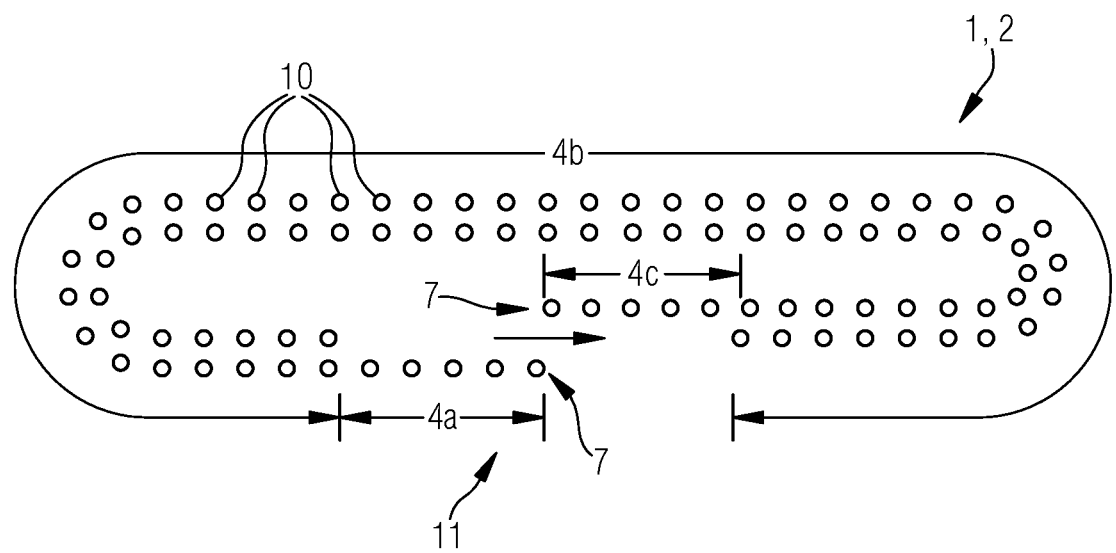

Another exemplary embodiment of a clothing 2 according to the invention will now be described with reference to FIG. 4. Identical components are given the same reference numerals as in the embodiments described above. A repetitive description of already-known components may accordingly be dispensed with. FIG. 4 shows a highly schematic lateral view of a clothing 2 according to the invention; for better clarity and clarity, the warp threads are not shown, but in FIG. 4 the weft threads are shown from the side or cut, now generally designated as 10.

In the exemplary embodiment shown in FIG. 4, the sections 4 of the flat woven material 1 are distributed differently with respect to their dimensions than in the embodiments described above. Sections 4a and 4c are now limited to the areas which form the ends 7 of the flat woven material 1, which are later brought together and potentially joined. As shown in highly schematic form in FIG. 4, the region 4b is designed with two layers and the adjacent short regions 4a and 4c have a single layer; by overlaying the regions 4a and 4c, a two-layered woven material is also formed there, so that a connecting region 11 formed in this way has properties that are almost identical to the rest of the clothing 2. This exemplary embodiment thus represents a special case of the principle generalized above. Here, in particular, the possibility is given of matching up the two ends 7 by simply laying them on top of each other and then connecting them, for example, by gluing or welding. By a suitable choice of the length of the ends 7 seen in the machine direction, a load distribution may take place over a relatively large area, which requires little adhesive or other action such as laser or ultrasonic welding, so that the property profile in the seam area is almost identical to the remainder of the clothing. This is advantageous in terms of the reduced marking tendency and the resulting improved quality of the fibrous web. The length of the connecting region 11 may for example be 50 cm, preferably 20 cm, particularly preferably 5 cm. If stabilizing seams 9 are provided as described above, the connection may also be omitted in this exemplary embodiment, and the single-layered sections 4a, 4c may merely be superimposed on each other.

In addition, the formation of the seam loops 8 may take place as described above, without needing to take into account the transition points 6 between the sections 4. Weft threads 10 are simply pulled out after the flat woven material 1 is laid over itself and the ends 7 of the flat woven material 1 are connected in the connection region 11 at the transverse edges of the clothing 2 formed by folding and in this way the seam loops 8 are formed, which again are put into each other and may be connected via a seam wire. Also, the it is possible to introduce stabilizing seams 9 as mentioned further above.

The clothing 2 according to the exemplary embodiments described above may now be furnished with other functional layers or staple fiber/nonwoven layers, in a manner known in the art. In this case, staple fiber/nonwoven layers are placed on the structure and by means of a needling path, they are anchored in the basic structure by the fibers of the staple fiber/nonwoven layers being pulled through the structure by barbed needles. By avoiding the moiré effect, better results may also be achieved here, especially with regard to lower fiber loss when anchoring the fibers. Other functional layers such as polyurethane films may be applied to and connected to the structure. It is also possible to introduce other layers, which may be formed, for example, as a web or knitted fabric or may be in the form of other woven fabric layers. Additional layers may be attached to one side of the clothing 2 facing the fibrous web, but it is also possible to insert the additional layers as inlays before flattening them between the two layers of flat woven material 1 and to fix them in a fixing process such as needling, gluing or welding.

The applicability of the invention is thus not limited to press felts. Such clothings 2 may also be used in other positions in fibrous web machines.

The invention claimed is:

1. A clothing, comprising:
    a basic structure being a portion of a flat woven material, said flat woven material being formed of mutually intersecting warp threads and weft threads;
    a portion of said flat woven material having a plurality of sections that are integrally formed in one piece with one another, wherein at least one property of one of said sections is different from the respective property of at least one adjoining section,
    said portion having three successive sections that extend one behind another in a machine direction of the clothing, wherein a first section is followed by a second section and the second section is followed by a third section; and
    a length of said first and third sections equals or is less than 50 cm, and wherein said first and third sections are woven in one layer and said second section is woven in two layers, to form the clothing in two layers in an entirety.

2. The clothing according to claim 1, wherein said at least one property is selected from the group consisting of a weave pattern, a number of web layers, a material of the weft threads and/or a material of the warp threads, a material thickness of the weft threads and a density of the weft threads.

3. The clothing according to claim 1, wherein at least one of said sections is woven in one layer and at least one other section is woven in two or more layers.

4. The clothing according to claim 1, wherein a thickness of said weft threads of at least one of said sections is different from a thickness of said weft threads of at least one other section.

5. The clothing according to claim 1, wherein a material of said weft threads of at least one of said sections is different from a material of the weft threads of at least one other section.

6. The clothing according to claim 1, wherein the length of said first and third sections in the machine direction corresponds at least to a length of said second section in the machine direction.

7. The clothing according to claim 6, wherein the length of said first and third sections exceeds the length of said second section by 0-5%.

8. The clothing according to claim 6, wherein the length of said first and third sections exceeds the length of said second section by 3%.

9. The clothing according to claim 1, wherein the length of said first and third sections is less than 20 cm.

10. The clothing according to claim 1, wherein the length of said first and third sections is less than 5 cm.

11. The clothing according to claim 6, wherein the properties of said first section equal the properties of said third section.

12. The clothing according to claim 11, wherein at least one property of said second section is different from the properties of said first and third sections.

13. The clothing according to claim 1, configured for use in a machine for manufacturing and/or finishing a paper, cardboard, tissue or pulp web.

14. A method of producing a clothing according to claim 1, the method comprising:
    i) producing a flat woven material by weaving a sequence of sections;
    ii) cutting to length a portion of the flat woven material that contains three sections; and
    iii) folding over at any location within a second section, wherein the first and third sections are superimposed on each other and brought into line, and wherein the first and the third sections are woven in one layer and the second section is woven in two layers.

15. The method according to claim 14, which further comprises removing weft threads at the transition points in order to form seam loops.

16. The method according to claim 15, wherein step vi) further comprises introducing stabilization seams after removing the weft threads.

17. The method according to claim 14, which comprises, after superimposing and bringing the first and third sections in line, connecting the first and third sections to one another.

18. The method according to claim 17, which comprises connecting by gluing, ultrasonic welding or laser welding.

\* \* \* \* \*